United States Patent [19]
Renoux

[11] 3,937,110
[45] Feb. 10, 1976

[54] LATHE FOR MACHINING HOLLOW PARTS
[75] Inventor: Pierre E. Renoux, Colombes, France
[73] Assignee: CRI-DAN, Paris, France
[22] Filed: Apr. 1, 1075
[21] Appl. No.: 563,957

[30] Foreign Application Priority Data
Apr. 8, 1974 France .................... 74.12281

[52] U.S. Cl. .................................... 82/25; 82/16
[51] Int. Cl.² ................... B23B 21/00; B23B 5/30
[58] Field of Search .......................... 82/16, 25

[56] References Cited
UNITED STATES PATENTS
| | | | |
|---|---|---|---|
| 1,963,023 | 6/1934 | Libby | 82/25 |
| 3,187,611 | 6/1965 | Sweet | 82/25 |

Primary Examiner—Harrison L. Hinson
Attorney, Agent, or Firm—Lane, Aitken, Dunner & Ziems

[57] ABSTRACT

A lathe for machining interior surfaces of revolution in hollow parts supported on a rotational axis by a head-stock and including a pair of transversely and longitudinally movable carriages arranged symmetrically on the work piece rotatable axis, the carriages each supporting at least one tool holder bar projecting along the work piece rotational axis and having a cooperating cross-sectional configuration by which the tool holder bars are supported along their length by engagement with each other. Alternatively the carriages may support turrets each carrying a plurality of cooperable tool holding bars in a manner such that the operative pair of tool holding bars derives similar support one from the other. In both embodiments, the cutting tools supported by the bars are disposed on a diametric plane inclined with respect to the holder bar in engagement plane to resolve all cutting forces into exclusively torsion on the tool holder bars.

3 Claims, 13 Drawing Figures

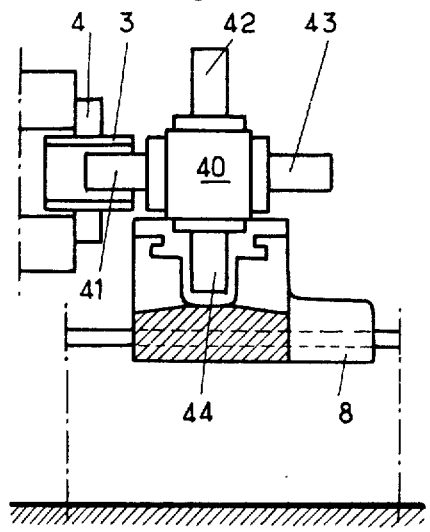
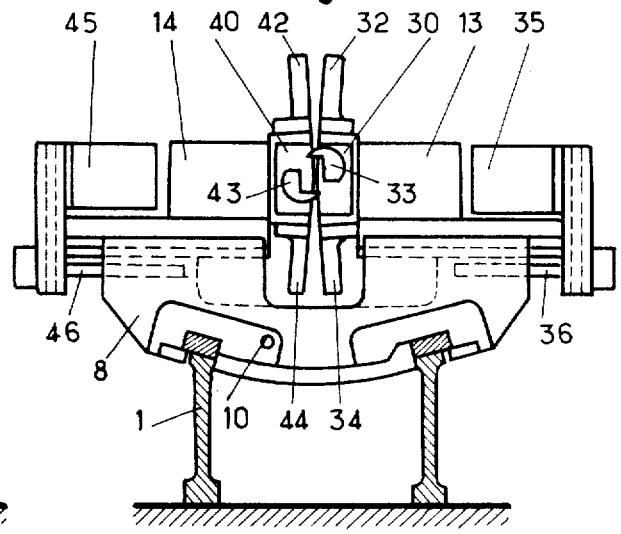
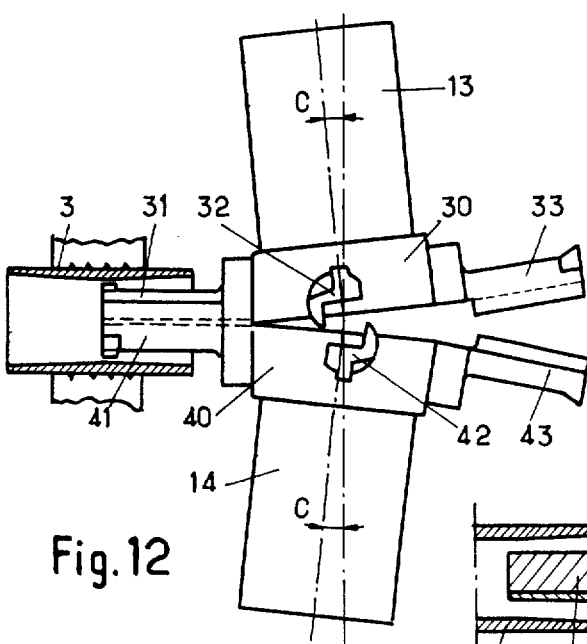
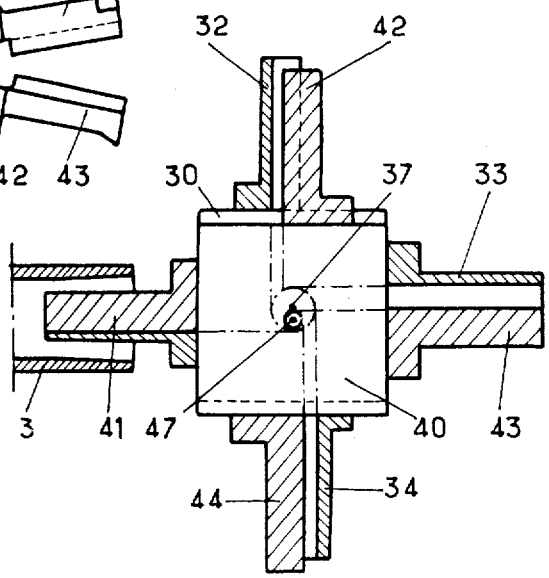

LATHE FOR MACHINING HOLLOW PARTS

BACKGROUND OF THE INVENTION

This invention relates to a lathe for the interior machining of hollow revolving parts, such as threaded pipe coupling sleeves, for example, which generally are formed with two opposite conical threads.

In the formation of hollow parts with interior machined surfaces of revolution such as conical surfaces, interior machining is advantageously performed on machines of the lathe type. The removal of the metal necessary to produce the interior surfaces, especially threads, is thus performed by cutting tools attached to the end of a tool holding bar or bars having an outside diameter necessarily smaller than the inside diameter of the sleeve to be formed and a length necessarily in excess of the depth of the interior conical surface to be machined. This results in a limitation of the power that can be applied to the tool due to the limited rigidity of the tool holding bar and consequently in a limitation on the rate of metal removal per unit of time. Because of these limitations, the present production costs of machining the interior threads of pipe coupling sleeves in quantity are substantially increased over projected costs where the output of a machine is increased in terms of rate of metal removal.

SUMMARY OF THE INVENTION

In accordance with the present invention, the rate of metal removal from interior conical surfaces is increased by a lathe having two carriages arranged symmetrically with respect to the rotational axis of the part to be machined and capable of moving longitudinally and transversely in parallel with a common plane passing through such axis, each of the carriages supporting at least one tool holding bar which is so designed that it is supported on a corresponding tool holding bar of the other carriage by at least one surface parallel to the common plane.

As a result of the tool holding bars being supported upon each other, they no longer need to sustain individually the cutting effort developed by their respective tools, as is the case with a conventional machine. The tool holding bars instead must simply resist the torque resulting from the composite of two equal and opposite parallel forces, a condition which completely changes the nature and the value of the stresses engendered. Moreover, the reaction of the tools upon the machined part and the members of the machine supporting it is also completely changed. Instead of a radial force tending to cause the spindle of the machine to bend, the spindle is subjected only to torque loading in the lathe of this invention. The combination of these two effects makes it possible to increase considerably the cross-section of the chip removed with each cutting passage and to increase the output or production speed proportionately.

The tools are preferably arranged on their respective tool holding bars in such a manner that, when in the working position, the cutting edges of these tools will be situated in a diametric plane which will be inclined slightly with respect to the translation plane of the carriages. The inclination of the cutting plane can be selected so that the direction of the cutting efforts will be approximately perpendicular to the direction of transverse movement of the tools. Thus the relative displacements of one bar with respect to the associated bar will require only a very small effort as compared to the cutting efforts, a factor which facilitates compliance with precision requirements in the desired machined diameter.

Each of the transverse carriages of the lathe may be equipped with a revolving turret supporting several tool holder bars, for example, four. This arrangement is useful in forming many parts which require machine operations more complex than simple conical boring and threading, such as machining operations which require tools of various shapes working in succession.

The adaptation of turrets for tool holder bars according to the invention, capable of being supported upon each other in their working position, poses a difficult problem of aligning the rotational axes of the two turrets with very great precision. In accordance with the present invention, this problem is solved by providing a deliberate misalignment of the turrent rotation axes so that the associated tool holder bars will be supported upon each other only in their working position. For this purpose, the rotational axes of the two turrets, situated in planes parallel to the translation plane of the carriages, are inclined at one and the same acute angle, varying slightly from 90°, for example, with respect to the rotational axis of the part to be machined. They are furthermore slightly staggered on either side of said axis. Thus, when outside the working position, the tool holder bars are separated from each other to facilitate cleaning of the corresponding support surfaces.

BRIEF DESCRIPTION OF THE DRAWINGS

Several embodiments implementing the invention are described below by way of example with reference to the attached drawings as follows:

FIGS. 10-13 are schematic views illustrating another mode of implementing the lathe according to the invention where each of the transverse carriages is equipped with a turret provided with several tool holder bars.

DETAILED DESCRIPTION OF THE PREFERRED EMBODIMENTS

Figure 1:
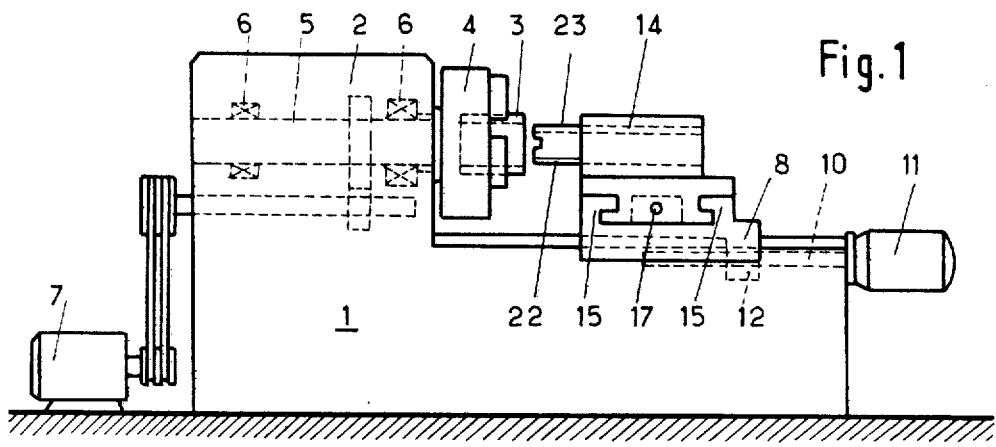
FIG. 1 is a schematic front elevation of a lathe according to the invention.
Figure 2:
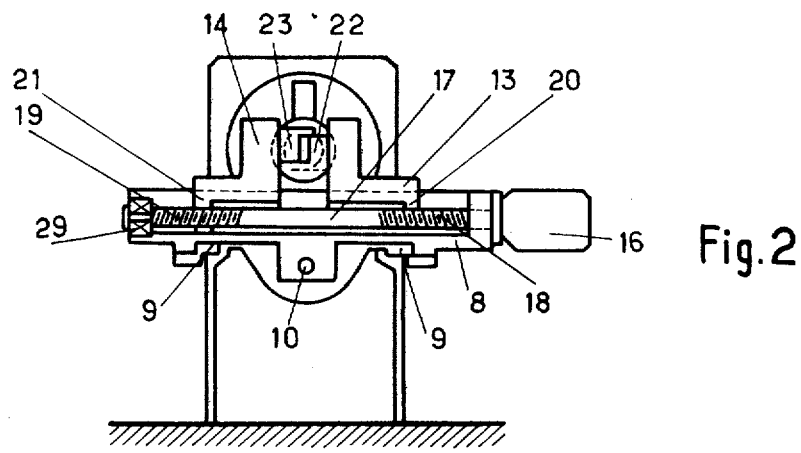
FIG. 2 is a partially cut-away side elevation of the lathe illustrated in FIG. 1.

The lathe illustrated schematically in FIGS. 1 and 2 comprises a frame or bed 1 supporting a head-stock 2 for moving the part 3 to be machined, in this instance a hollow revolving part such as a pipe coupling sleeve, which must generally include two opposite conical threads. The latter is retained by means of screwing upon a part-carrier chuck 4 which is in one piece with a rotating spindle 5 which turns in bearings 6 of the head-stock 2. The spindle 5 is rotated by means of a motor 7 through intermediate transmission members of the known type, comprising, for example, pulleys, belts, and gears.

On the bed plate 1, there is placed a longitudinal carriage 8 which can move parallel to the axis of spindle 5 along slides 9. The movement of this carriage is accomplished by known means, such as a screw 10 rotated by a motor 11 and cooperating with a nut 12 which is in one piece with the carriage 8.

On the longitudinal carriage 8, there are arranged two transverse carriages 13 and 14 which can move perpendicularly to the axis of spindle 5 along slides 15 provided on carriage 8. The movement of these transverse carriages is accomplished by the motor 16 which rotates a screw 17 axially connected to the longitudinal carriage 8 by a thrust-bearing 29. The screw 17 is provided with two threads 18 and 29, with the same pitch but running in opposite directions, and cooperating respectively with two nuts 20 and 21 having a corresponding pitch, attached to each of the carriages 13 and 14.

It can easily be seen that by combining the movement produced by the motor 16 with the movement produced by the motor 11, any desired symmetrical movements for the two transverse carriages 13 and 14 can be achieved.

Figure 3:
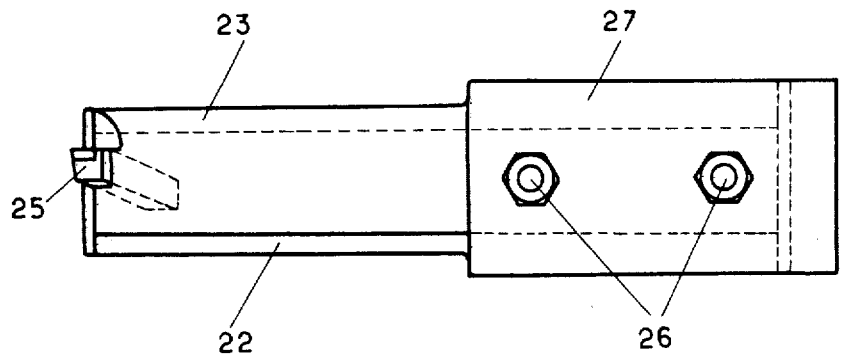
FIGS. 3 and 4 are detail views on a larger scale showing the tool holder bars.
Figure 4:
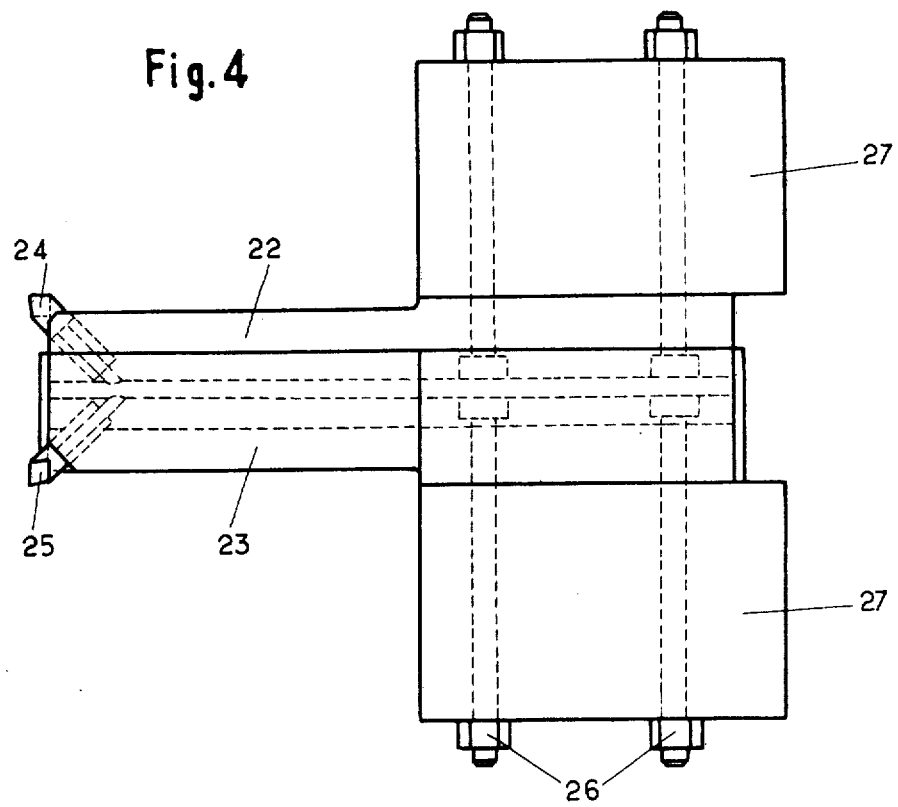

Each of the transverse carriages 13 and 14 is equipped with a tool holder bar 22 and 23, respectively. The bars are capable of penetrating into the interior of the sleeve 3 to be machined and they are more clearly shown in FIGS. 3 and 4. Thus, each of the tool holder bars comprises at one of its ends, a housing capable of receiving a cutting tool 24 and 25, respectively, whereas the other end is attached by means of two bolts 26 on a support such as 27 which in turn is attached by appropriate means, not shown, to the corresponding transverse carriage.

Figures 5, 6:
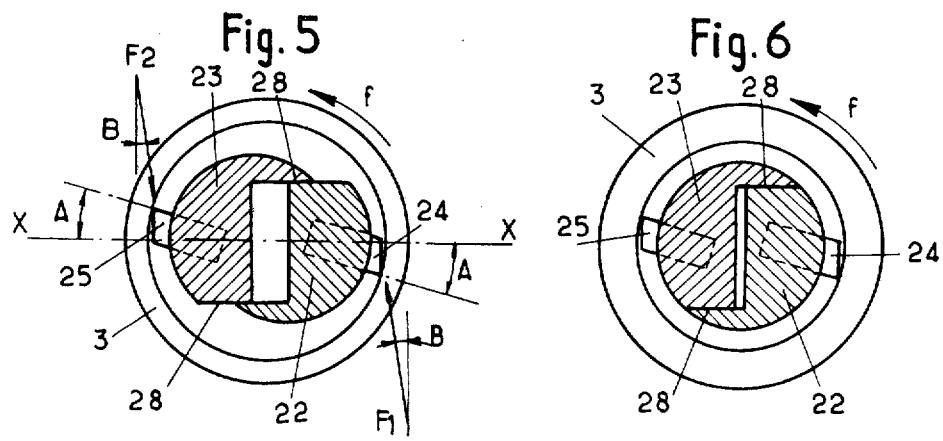
FIG. 5 is a transverse cross-sectional view showing the tool holder bars in working position inside a sleeve.
FIG. 6 is a view similar to FIG. 5 showing the tool holder bars in another working position.

In accordance with the invention, the two tool holder bars are so designed that they will be supported upon each other in their working position, under the action of cutting efforts by the tools 24 and 25. As shown very clearly in FIGS. 5 and 6, the cross-section of the bars 22 and 23 is of a shape such that each one of them rests upon the other through two plane surfaces 28 parallel to the translation plane of longitudinal carriage 8; that is to say, the horizontal plane in this case. The two bars can thus move symmetrically in the transverse direction between their two extreme radial position, represented respectively in FIGS. 5 and 6, without ceasing to be in contact through the plane surfaces 28. The position in FIG. 5 corresponds to the maximum diameter produced whereas the position in FIG. 6 corresponds to the minimum diameter produced.

Of course, the outside contour of the two tool holder bars is adapted to the shape of the parts to be machined. In particular, this contour is such that, in the position shown in FIG. 6, the overall cross-section of the two bars is perfectly cylindrical. Also it is to be noted that the arrangement of the respective supporting surfaces 28 depends on the direction of rotation of the part to be machined, designated by arrow f. Specifically, if the direction of rotation of the part 3 were to be reversed, one would not get the desired result, that is to say, the support of the two bars upon each other under the action of the cutting forces.

Furthermore it is noted that the cutting tools 24 and 25 are arranged on their respective tool holder bar so that the cutting edges of these tools will be situated in a diametric plane inclined with respect to plane X — X, the horizontal plane of tool holder bar movement in this instance. The inclination angle A of the tool plane may be so selected that the cutting forces $F_1$ and $F_2$ will be essentially perpendicular to the plane X — X and, more specifically, so that these cutting forces will, with the line perpendicular to that plane, form an angle B close to the friction angle (an angle whose tangent is equal to the friction coefficient) of the two tool holder bars upon each other. Since conical machining is generally accomplished in the direction of decreasing diameters, the cutting efforts therefore tends to help the approach movement of the tool holder bars whereas their movement away from each other takes place when the tools are not working.

It will be seen that the resulting forces on each of the tool holder bars, due to the cutting forces, is reduced to a torque when the forces $F_1$ and $F_2$ are equal and when they have parallel and opposite directions. In practice, these forces are not always strictly equal but their resultant is equal only to their difference. By way of comparison, removal of the same metal cross-section with a single tool, as is the practice on an ordinary lathe, the cutting force would have to be essentially equal to $F_1 + F_2$ and the single bar carrying this single tool would necessarily be subject to more bending stress than the two associated bars according to the invention.

Thus it will be appreciated that the lathe according to the invention makes it possible considerably to increase the chip cross-section removed by each tool pass and thus to improve the output rate of such hollow parts considerably.

Figure 7:
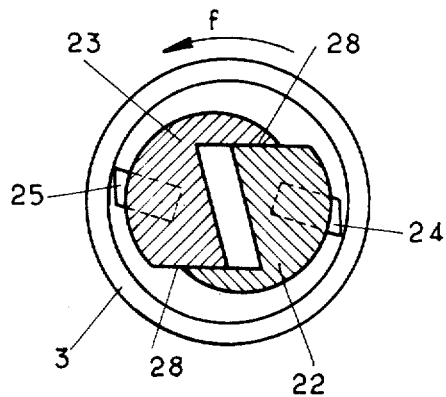
FIGS. 7-9 illustrate alternate embodiments of the tool holder bars.
Figure 8:
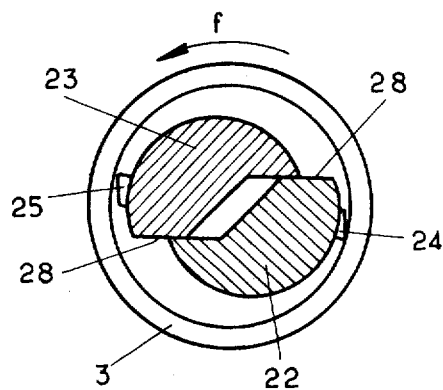
Figure 9:
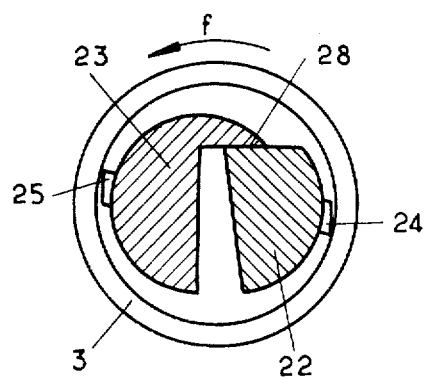

In FIGS. 7–9, several possible variants of tool holder bars according to the invention are illustrated. In FIG. 9 especially is shown one mode of implementation in which each of the tool holder bars is supported from the other one only through a single plane surface 28.

An alternative embodiment of a lathe according to the invention is shown in FIGS. 10–13. Here, each of the transverse carriages 13 and 14 is equipped with a rotating turret 30 and 40, respectively, each provided with four tool holding bars 31–34 and 41–44. Thus it will be seen that such a machine makes it possible to accomplish machining operations requiring tools with different shapes working in succession and which are much more complex than simple conical boring and threading.

Further, it is contemplated that certain of the tools on the bars 31–34 and 41–44 might not be coupled in pairs in some machining operations where the forces involved will not justify this type of operation. To make that possible, the two transverse carriages 13 and 14 can move individually on the common longitudinal carriage 8 due to separate control means here constituted by two motors 35 and 45, respectively rotating two screws 36 and 46.

A strict alignment of rotational axes 37 and 47 of the two turrets 30 and 40 respectively poses a delicate problem in the attainment of full supporting engagement of one of the bars 31–34 with the other 41–44. This problem is solved according to the invention by a deliberate misalignment of these two axes so that the coupled two-carrier bars will support each other only in the working position.

Thus, as illustrated in FIG. 12, the rotational axes of the two turrets 30 and 40 are slightly inclined at one and the same angle C with respect to a line perpendicular to the axis of the part 5 to be machined. Moreover, these rotational axes 37 and 47, while being situated in planes parallel to the plane of horizontal translation of the tools, are also slightly staggered on either side of the axis of the part to be machined, as illustrated in FIG. 13.

The desired tool holder supporting effect is thus obtained while facilitating the cleaning of the support surfaces provided on the tool holder bars since, when outside the working position, the latter are moved apart from each other.

I claim:

1. In a lathe having a head-stock for supporting a work piece on a rotational axis concentric with an interior surface of revolution in the work piece to be machined, cutting tool supporting means comprising:

a pair of carriages arranged symmetrically with respect to the rotational axis and movable longitudinally and transversely in parallel with a common plane passing through said axis, at least one tool holder bar supported by each of said carriages and projecting generally parallel to said rotational axis, the cross-sectional configuration of at least one of said tool holder bars defining a surface parallel to said common plane for supporting the other of said tool holder bars.

2. The apparatus recited in claim 1 including a pair of cutting tools supported respectively on said tool holder bars so that the cutting edges of said tools will be positioned in a diametric plane inclined slightly with respect to said common plane.

3. The apparatus recited in claim 1 including a rotating turret supporting a plurality of tool holding bars, one such turret being supported on each of said carriages, the rotational axes of said turrets lying in planes parallel to said common plane and inclined with respect to the rotational axis of said work piece at the same acute angle of slightly less than 90°, said turret axes being also slightly offset on opposite sides of said work piece axis.

* * * * *

UNITED STATES PATENT OFFICE
CERTIFICATE OF CORRECTION

Patent No. 3,937,110      Dated February 10, 1976

Inventor(s) Pierre E. Renoux

It is certified that error appears in the above-identified patent and that said Letters Patent are hereby corrected as shown below:

Page 1, item "[22] Filed: April 1, 1075" should read

--[22] Filed: April 1, 1975--.

Column 3, line 11, "threads 18 and 29" should read --threads 18 and 19--.

Signed and Sealed this

Twentieth Day of July 1976

[SEAL]

Attest:

RUTH C. MASON
*Attesting Officer*

C. MARSHALL DANN
*Commissioner of Patents and Trademarks*